United States Patent [19]

Lynch et al.

[11] Patent Number: 5,128,891
[45] Date of Patent: Jul. 7, 1992

[54] HIGH SPEED DIVIDER WITH SQUARE ROOT CAPABILITY

[75] Inventors: Thomas W. Lynch; Stephen D. McIntyre, both of Austin, Tex.; Ken Tseng, Menlo Park, Calif.; Salim A. Shah; Tony Hurson, both of Austin, Tex.

[73] Assignee: Advanced Micro Devices, Inc., Sunnyvale, Calif.

[21] Appl. No.: 504,324

[22] Filed: Apr. 2, 1990

[51] Int. Cl.[5] .............................................. G06F 7/52
[52] U.S. Cl. .................... 364/767; 364/752
[58] Field of Search ............... 364/767, 761, 764, 784, 364/752

[56] References Cited

U.S. PATENT DOCUMENTS

| | | | |
|---|---|---|---|
| 4,075,704 | 2/1978 | O'Leary | 364/748 |
| 4,546,447 | 10/1985 | Sawada | 364/767 |
| 4,683,547 | 7/1987 | DeGroot | 364/748 |
| 4,688,186 | 8/1987 | Ferrell et al. | 364/764 |
| 4,722,069 | 1/1988 | Ikeda | 364/767 |
| 4,724,529 | 2/1988 | Irukulla | 364/761 |
| 4,878,190 | 10/1989 | Darley et al. | 364/761 |
| 4,939,686 | 7/1990 | Fandrianto | 364/767 X |
| 4,979,142 | 12/1990 | Allen et al. | 364/767 |

OTHER PUBLICATIONS

Birman et al., "Developing the WTL3170/3171 Sparc Floating-Point Coprocessors", *IEEE Micro*, pp. 55-64, Feb. 1990.

*Primary Examiner*—Tan V. Mai
*Attorney, Agent, or Firm*—Johnson & Gibbs

[57] ABSTRACT

An apparatus for performing the division of a first operand by a second operand by iteratively producing a series of partial remainders and predicted quotient bits utilizing the generation of multiples of the second operand and the selection of one of the generated multiples. The second operand is first selected as a first partial remainder. A first quotient bit is predicted from the first and second operands and a next quotient bit is predicted from the partial remainder and the second operand. One of the generated multiples is selected for producing a next partial remainder based upon the next quotient prediction. A next partial remainder is then produced from the produced partial remainder and the selected multiple of the second operand.

33 Claims, 7 Drawing Sheets

WHERE j = CURRENT ITERATION
i = TOTAL NUMBER OF QUOTIENT BITS
P = POINTERS

HIGH SPEED DIVIDER WITH SQUARE ROOT CAPABILITY

CROSS REFERENCES TO RELATED APPLICATIONS

This application is related to the following U.S. Patent Applications:

| SERIAL NO. | TITLE | INVENTOR | U.S. Pat. No. |
|---|---|---|---|
| 07/503,817 | Pipelined Floating Point Processing Unit | Perlman, et al. | 5,053,631 |
| 07/503,819 | Normalizing Pipelined Floating Point Processing Unit | Gupta, et al. | 5,058,048 |
| 07/504,127 | Arithmetic Unit Having Multiple Accumulators | Tamura, et al. | |
| 07/505,351 | Apparatus and Method for Collecting Boolean Conditions of Multiple Operations | McMinn, et al. | |
| 07/505,350 | A Special Carry Save Adder for High Speed Iterative Division | Shah, et al. | |
| 07/503,818 | High Speed Mixed Radix Adder | Lynch, et al. | |
| 07/505,822 | Radix 4 Carry Lookahead Tree and Redundant Cell Therefor | Lynch, et al. | |

The above listed applications are all filed on even date herewith, assigned to the assignee of this invention and are hereby incorporated by reference as if reproduced in their entirety.

BACKGROUND OF THE INVENTION

Field of the Invention

The present invention relates to a floating point processor for a computer system and, more particularly, to a high speed divider which performs non-restoring iterative division in radix 4. The present invention further relates to a high speed divider which performs non-restoring iterative division in radix 4 and square root calculations in radix 2.

Description of Related Art

Many computer programs require a large number of floating point arithmetic operations. Consequently, a large number of the instructions executed by a computer in which such programs are run are floating point instructions. For such programs, the greater the number of floating point arithmetic instructions that can be executed per cycle, the faster the machine speed of operation. Accordingly, numerous efforts have been made to speed up floating point processing time. For example, U.S. Pat. No. 4,683,547 to DeGroot discloses a floating point arithmetic unit which allows two floating point results to be produced each cycle. That same patent discusses prior art teachings of arithmetic units which allow multiple arithmetic operations to be executed at once. Yet another approach is shown in U.S. Pat. No. 4,075,704 to O'Leary. In O'Leary, the floating point adder and the floating point divider are pipelined circuits which include a plurality of stages with intermediate temporary storage means for catching partial results computed during one clock period for presentation to a next stage during a next clock period. Approaches such as those disclosed in DeGroot and O'Leary concentrated primarily on speeding up the capability of a floating point arithmetic unit to do repeat operations and were not directed towards increasing the speed at which a floating point arithmetic unit could perform a specified operation.

As division is the most complex of the arithmetic operations and has typically required more hardware and computational time than the other arithmetic operations such as addition or multiplication, the speed at which a division calculation can be performed by a divider is of particular importance. For example, as the number of digits included in the operands for which a division operation is to be performed increases, an exceedingly long time is required for a divider to perform the desired arithmetic operations. Further by example, large-size computer having high-speed multipliers often employ multiplication type division in which division is performed by repetition of multiplication. However, implementation of such multiplication-type division by combinational circuitry requires large numbers of hardware elements and is therefore impractical.

Division techniques may be divided into "restoring" division techniques and "non-restoring" division techniques. In non-restoring division, a series of quotient digits having the values:

$$-((Beta)-1), \ldots, -2, -1, 1, 2, \ldots, ((Beta)-1)) \quad (1)$$

where (Beta) is the radix of the divisor, k is the redundancy factor; are previously determined and each digit of the quotient is selected from the set of quotients in an iterative method which also produces a series of partial remainders utilized in selecting the next quotient digit. A variant of non-restoring division is generally referred to as "SRT" division which is characterized by the prior determination of a series of quotient digits in the range of:

$$-(k((Beta)-1)), \ldots, -2, -1, 0, 1, 2, \ldots, (k((Beta)-1)) \quad (2)$$

where (Beta) is the radix of the division from which each quotient digit is selected.

A characteristic feature of nonrestoring type dividers is the use of a negative number as well as a positive number in the partial remainder which is produced from a previous operation in which a digit of the quotient is determined. One such nonrestoring type divider is disclosed in U.S. Pat. No. 4,722,069 to Ikeda. Ikeda discloses a nonrestoring type divider which includes a divisor register for storing a divisor, a partial remainder register for storing a dividend or a partial remainder, a predictor for predicting a partial quotient, a multiplier for multiplying the contents of the divisor register, a first adder for subtracting the output of the multiplier from the contents of the partial remainder register and for calculating the partial remainder in such a manner that the predictor predicts the partial quotient from upper digits of the divisor register and upper digits of the partial remainder. The use of multipliers and multiple adders in the Ikeda divider, however, would likely add significant increases in both the cost and space requirements of the divider due to its relatively hardware intensive design.

Another non-restoring type divider is disclosed in U.S. Pat. No. 4,724,529 to Irukulla, et al. While the Irukulla et al. divider includes an adder/subtractor which calculates a partial remainder according to the relationship $$P_{j+1} = (\text{Beta})P_j - q_j D \qquad (3)$$

Irukulla, et al., however, utilizes cost and space expensive multiplication circuitry to produce $q_j D$. Finally, the article to Birman et al. entitled "Developing the WTL3170/3171 Sparc Floating-Point Coprocessors", *IEEE Micro*, pgs. 55-64 (Feb., 1990) discloses a floating point arithmetic operation unit for performing a non-restoring, radix 4 mantissa division and square root computations. However, the device disclosed in the Birman et al. article shares first division/square root logic and "times-three" generation with a multiplier, thereby preventing the floating point processor to perform multiplication operations during a divide operation. Furthermore, the device disclosed in the Birman et al. article is configured to require the generation of three times the divisor using multiplication circuitry before any quotient bits are determined, thereby slowing the calculation of the quotient.

It is an object of this invention to provide a high speed divider which performs non-restoring iterative division in radix 4.

It is another object of this invention to provide a high speed divider which performs non-restoring iterative division in radix 4 and square root calculations in radix 2.

It is yet another object of this invention to provide a divider which minimizes the amount of logic circuitry required while speeding the divider to operate at the rate of an iteration of the division operation per clock pulse phase.

It is still yet another object of this invention to provide a divider having a pair of parallel quotient registers for storing a quotient prediction for output and for storing the quotient prediction minus one for correcting erroneous quotient predictions before output.

SUMMARY OF THE INVENTION

In one aspect, the present invention is of a divider for performing a division of a first operand by a second operand to produce a result which includes means for iteratively producing a series of partial remainders, means for iteratively predicting a series of quotient bits, means for generating multiples of the second operand and means for selecting one of the generated multiples. The means for producing a series of partial remainders selects the second operand as a first partial remainder. The quotient predictor means predicts a first quotient bit based upon the first and second operands and a next quotient bit based upon the produced partial remainder and the second operand. The selection means selects one of the generated multiples for producing a next partial remainder based upon the next quotient prediction. A next partial remainder is then produced from the produced partial remainder and the selected one of the multiples of the second operand.

In another aspect, the present invention is of an apparatus for dividing a dividend by a divisor to produce a result which includes a partial remainder register connected to receive and store partial remainders, a divisor register connected to receive and store the divisor, quotient prediction logic connected to receive the divisor from the divisor register and a series of partial remainders from the partial remainder register, a first quotient register connected to receive and store a series of quotient bits predicted by the quotient prediction logic, means for generating multiples of the divisor, and a special carry save adder connected to the means for generating multiples of the divisor and to the quotient prediction logic. The carry save adder selects multiples of the divisor based upon the predicted quotients and determines a next one of the series of partial remainder based upon the partial remainder stored in the partial remainder register and the selected divisor multiple. The quotient prediction logic then receives the next partial remainder to determine a next one of the series of quotient bits.

BRIEF DESCRIPTION OF THE DRAWINGS

The present invention may be better understood, and its numerous objects, features and advantages become apparent to those skilled in the art by referencing the accompanying drawings in which:

FIG. 1b is a block diagram of the quotient register illustrated in FIG. 1a;

DETAILED DESCRIPTION OF THE INVENTION

Figure 1A:
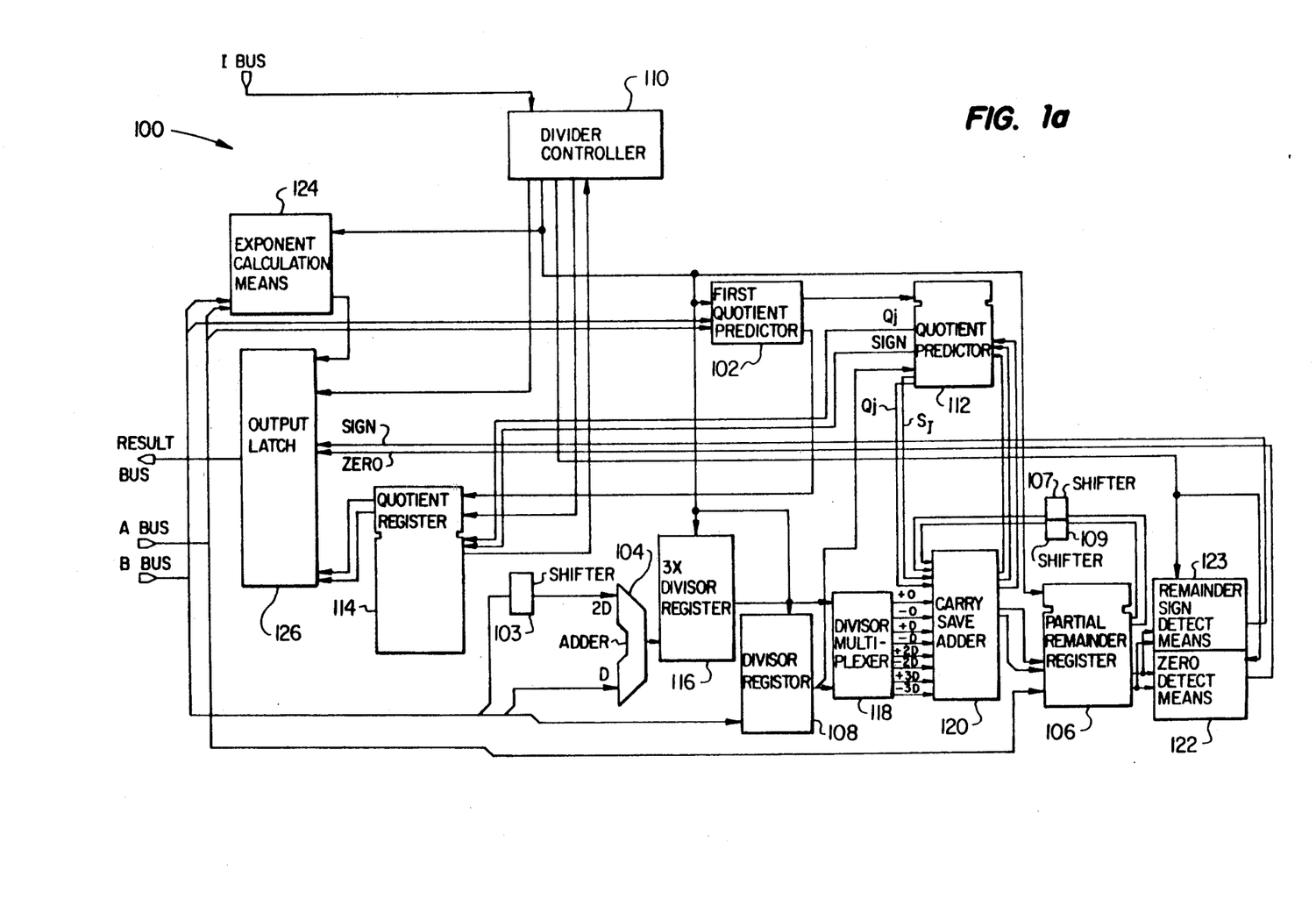
FIG. 1a is a block diagram of a first embodiment of a high speed divider for performing non-restoring iterative division in radix 4 constructed in accordance with the teachings of the present invention.

Referring first to FIG. 1, a high speed divider 100 for performing non-restoring iterative division in radix 4 shall now be described in detail. It is contemplated that the divider disclosed herein be used as a component of a floating point processor unit such as any one of the floating point processor units disclosed in co-pending U.S. patent application Ser. No. 07/503,817 entitled "Pipelined Floating Point Processing Unit" to Perlman et al., Ser. No. 07/503,819 entitled "Normalizing Pipeline Floating Point Processing Unit" to Gupta et al. and Ser. No. 07/504,127 entitled Arithmetic Unit Having Multiple Accumulators to Sobel et al., all filed on even date herewith and previously incorporated by reference. As was set forth in detail in the above-referenced applications, a floating point processor is comprised of a plurality of floating point arithmetic operation unit such as an adder, multiplier and divider for performing arithmetic operations on input operands. When a pair of input operands, for example, operand A and operand B, are input to a floating point arithmetic operation unit, the floating point arithmetic operation unit performs the desired arithmetic operation on the input operands and outputs the result on a result bus. Typically, a floating point processor may process both floating point and integer numbers. Various floating point formats may be supported, including 32 bit (single precision) and 64 bit (double precision). Additionally, the floating point processor may handle conversion of integers to floating point, and the reverse.

In a division operation, a dividend is divided by a divisor to produce a quotient. In the present invention, a dividend is supplied to the divider 100 along an A bus, a divisor is supplied to the divider 100 along a B bus and the quotient is output by the divider 100 along a RESULT bus. As to be described in greater detail below, the divider 100 is controlled by a divider controller 110 which receives instructions from an I bus and, based on the received instructions, generates control signals to the various elements of the divider 100, i.e. a first quotient predictor 102, a partial remainder register 106, a divisor register 108, a first quotient register 114a, a second quotient register 114b, a 3X divisor register 116, a zero detect means 122 and a remainder sign detect means 123, during a divide operation.

The A bus is connected to a first quotient predictor 102, and a partial remainder register 106. Similarly, the B bus is connected to the first quotient predictor 102, a shifter 103, a first input of adder 104 and a divisor register 108. To commence a divide operation, the divider controller 110 receives an instruction from the I bus to commence divide operations. The first stage of a division operation, generally referred to as the "pre-overhead" stage, commences when a dividend, for example, the operand A, is then supplied to the first quotient predictor 102 and the partial remainder register 106 along the A bus and a divisor, for example, the operand B, is supplied to the first quotient predictor 102 and the divisor register 108 along the B bus during a first phase of a two phase oscillating clock pulse generated and distributed by the system.

During the first phase of the clock pulse, the dividend A is latched in the partial remainder register 106 and the divisor B is latched in the divisor register 108. In addition, the dividend A and the divisor B are input the first quotient predictor 102 where a first bit $q_1$ of the quotient Q to be produced by dividing the dividend A by the divisor B is determined. The first quotient predictor 102 is comprised of combinational logic circuitry configured such that, depending on the dividend A and the divisor B input into the first quotient predictor 102, a first quotient bit $q_1$ will be determined.

Figure 2:
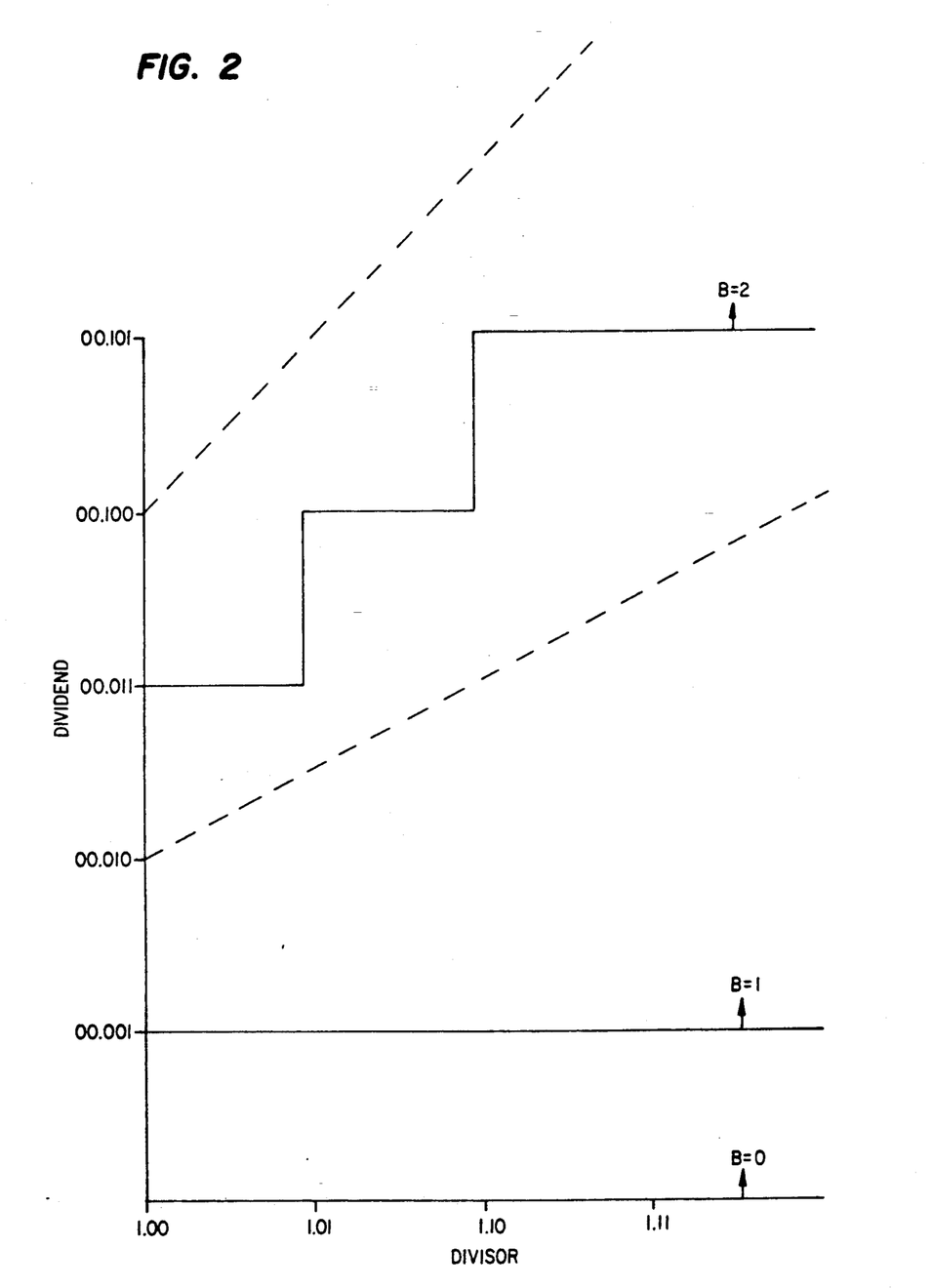
FIG. 2 is a graphical representation of the first quotient prediction logic of the divider of FIG. 1.

Referring next to FIG. 2, a graphical representation of the combinational logic circuitry which comprises the first quotient predictor 102 may now be seen. More specifically, FIG. 2 illustrates a logic PD plot which may be used to derive the combinational logic for the first quotient predictor 102. In FIG. 2, possible values for the divisor A input into the first quotient predictor 102 are set forth along the horizontal axis and possible values for the dividend B input into the first quotient predictor 102 are set forth along the vertical axis. Accordingly, each point on this plot is a divisor and dividend pair. Since numbers arriving at the divider 100 must be normalized, and because the dividend is initially divided by 4, and finally because the first quotient predictor 102 receives only the top couple of bits from each input operand, the only points that are used in the plot are: (1.00, 0.010), (1.00, 0.01), (1.01, 0.010), (1.01, 0.011), (1.10, 0.010), (1.10, 0.011), (1.11, 0.010) and (1.11, .011). However, since the real value of the divisor may lay in the interval [1.00, 10), and the real dividend may lay in the interval [0.01, 0.1), the first quotient predictor 102 of the divider 100 suffers from a quantization error. Accordingly, in FIG. 2, the lower dashed line represents the lower boundary upon which a first "guess" quotient of two may be chosen without being wrong by more than one too big. Similarly, the upper dashed line represents the lower bound in which the guess quotient of three may be chosen without being more than one too big and the upper boundary for which the quotient of one may be guessed. Finally, the upper and lower straight lines represents a quantized decision threshold which may be easily implemented in combinational logic. It should be readily apparent to those skilled in the art to which the invention pertains that, if the lower straight line represents the threshold on or above for which a quotient one is guessed, and the upper line represents the threshold on or above for which a quotient of two is guessed, that no matter what the real dividend and divisor are, the quantized guesses will be valid. In FIG. 2, all points will cause a quotient guess of 1, except (1.00, 0.011) and (1.01, 0.011) which will cause a quotient guess of 2.

Returning now to FIG. 1, the first quotient predictor 102 is connected to a quotient predictor 112 and the quotient register 114 such that, after the first quotient predictor estimates $q_1$, the estimate of $q_1$ is sent to the quotient predictor 112. In turn, the quotient predictor 112 sends a q1 value, which may be either 0, 1, 2, 3, and the corresponding sign bit to the quotient register 114. In addition, the first quotient predictor 112 sends a signal to the quotient register 114 to indicate the beginning of divide.

Figure 1B:
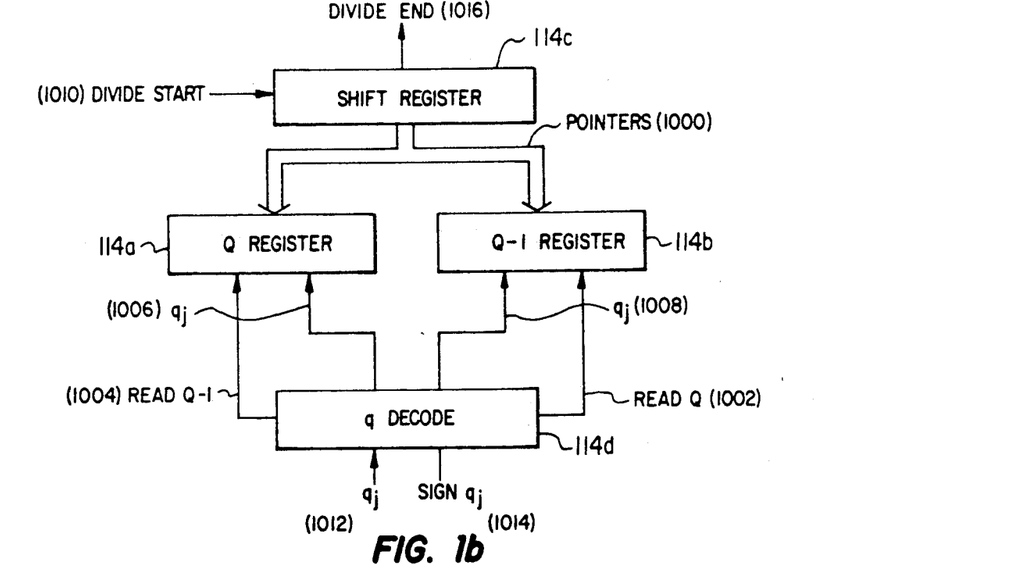

Referring next to FIG. 1b, the quotient register 114 illustrated in FIG. 1a shall now be described in greater detail. The quotient register 114 includes a first quotient (or "Q") register 114a for storing the current estimate of the final quotient Q, a second (or "Q−1") quotient register 114b for storing the current estimate of the final quotient Q minus 1 from the current bit position, j, a shift register 114c for generating current bit pointers 1000, a "divide start" control signal from the first quotient predictor 112, a "divide end" control signal 1016 output to the divider controller 110, a q decode block 114d for generating the current values of q and q−1 to be written into the quotient registers 114a, 114b, and means (illustrated in FIG. 1c) for writing the contents of the Q register 114a into the Q−1 register 114b and for writing the contents of the Q−1 register 114b into the Q register 114.

Figure 1C:
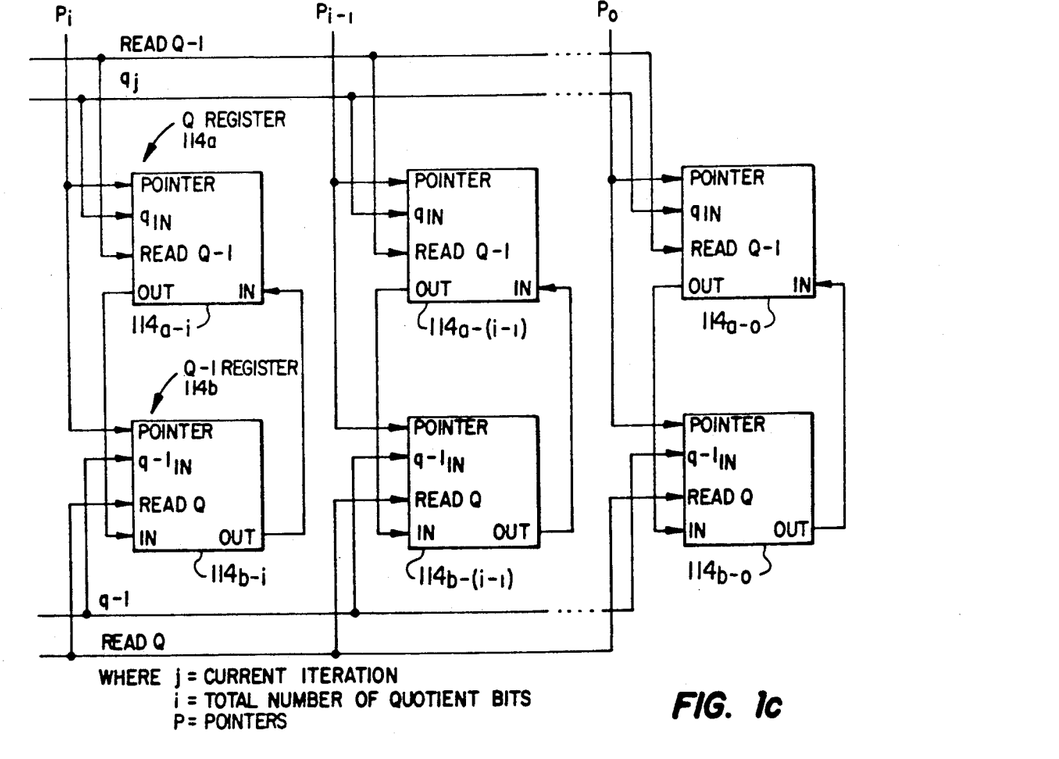
FIG. 1c is a block diagram illustrating additional details of the quotient register illustrated in FIGS. 1a-b.

Referring next to FIG. 1c, the quotient registers 114a, 114b shall now be described in greater detail. Each quotient register 114a, 114b is comprised of a series of quotient bit registers 114a−0, ... 114a−(i−1), 114a−i, 114b−0, ... , 114b−(i−1), 114b−i, respectively, connected in parallel. The shift register 114c receives the divide start signal from the first quotient predictor 112 and begins to generate pairs of pointers 1000 connected to pairs of the quotient bit registers 114a−0, ... 114a−(i−1), 114a−i, 114b−0, ... , 114b−(i−1), 114b−i, such that the pointers connected to the two most significant quotient register bits are asserted first. Successive iterations cause assertion of successively less significant pairs of pointers. Based on the $8_j$ value and sign sent from the second quotient predictor 112, the q decode block 114d generates the bit values to be written into the positions within the quotient bit registers currently being pointed at.

During any iteration, if the q sign is positive, the q decode 114d writes the q value to the position within the quotient bit registers 114a currently being pointed at and the q−1 value to the position within the quotient bit registers 114b currently being pointed at. All the remaining bit positions within the Q-1 register 114b are written to by the corresponding bit positions within the Q register 114a. Similarly, if the q sign value were to be negative, the q decode 114a would write the corresponding q value value to the position within the quotient bit register 114a currently being pointed at and the q−1 value to the position within the quotient bit registers 114b currently being pointed at. All remaining bit positions within the Q register 114a would be written to by the corresponding bit positions within the Q-1 register 114b. Finally, if the q value is zero, the position within the quotient bit register 114a would receive a 0 and the position within the quotient bit register 114b would receive a 3. Certain of the pointers 1000 are used as end of divide indicators 1016 for use by the divider controller 110 of FIG. 1.

Also during the first phase of the first clock pulse, the adder 104 receives the divisor at a first input and two times the divisor at a second input. The generation of two times the divisor is a relatively simple operation and may be performed by a shifter 103 which receives the divisor, produces two times the divisor by shifting the divisor over a single binary place to the left and outputs two times the divisor to the adder 104. The divisor register is connected with a divisor multiplexer 118 and, the divisor B is supplied to the divisor multiplexer 118, again during the first phase of the first clock pulse.

During a second phase of the first clock pulse, the "overhead" stage of the division operation commences with the calculation of a first iteration of the non-restoring division operation. At this time, the partial remainder register 106 supplies the dividend A and the divisor register 108 supplies the divisor B to the quotient predictor 112. Similar to, but somewhat more complicated than, the first quotient predictor 102, the quotient predictor 112 is combinational logic circuitry configured such that, depending on the dividend A and the divisor B input into the quotient predictor 112, a quotient bit $q_j$ and a sign bit $s_j$ will be selected by the quotient predictor 112.

Figure 3:
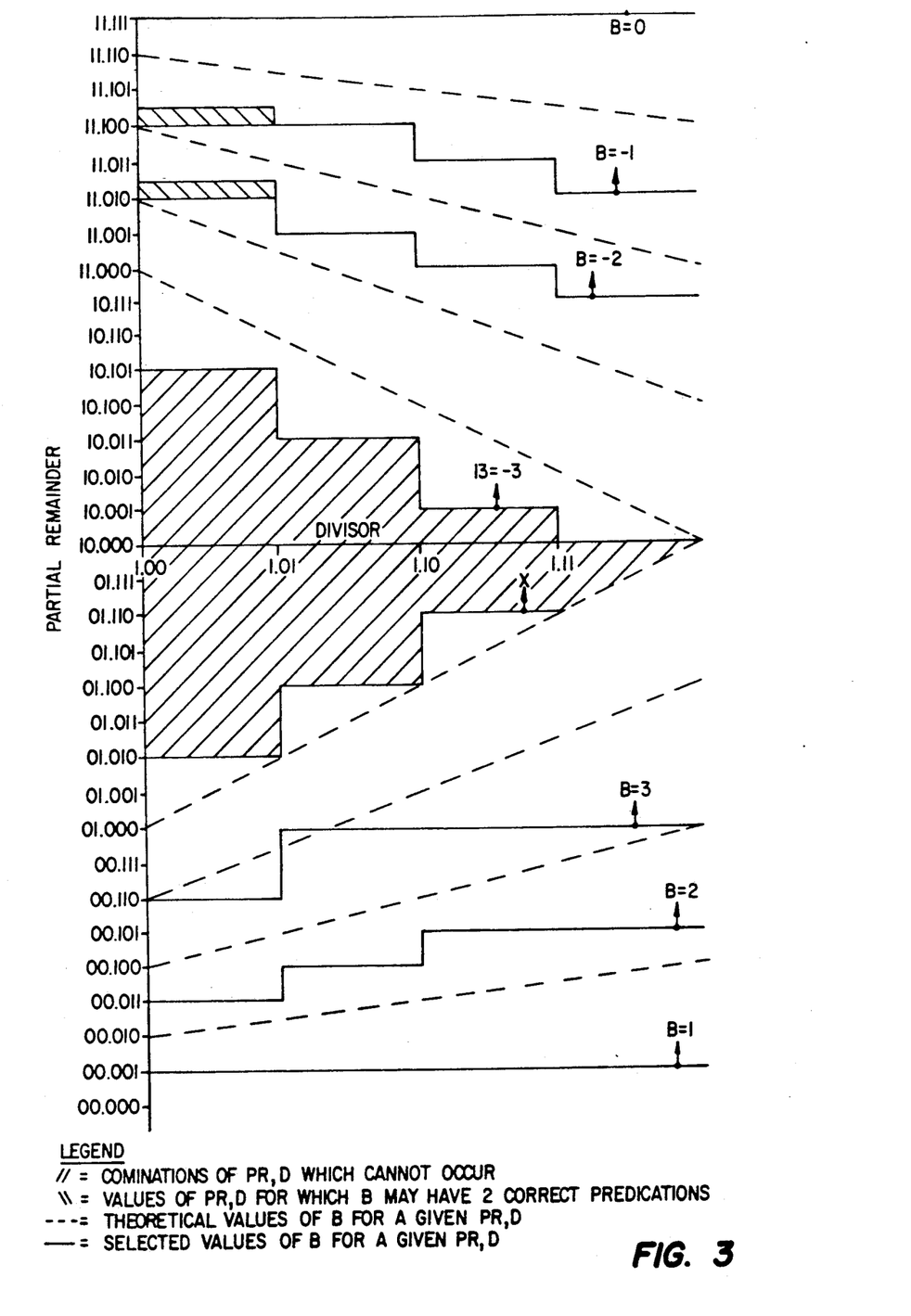
FIG. 3 is a graphical representation of the quotient prediction logic of the divider of FIG. 1.

Referring next to FIG. 3, a graphical representation of the combinational logic circuitry which comprises the quotient predictor 112 may now be seen. Like FIG. 2, FIG. 3 illustrates a logic PD plot which may be used to derive combinational logic, in this case, the combinational logic which comprises the quotient predictor 112. Furthermore, FIG. 2 represents a small section of FIG. 3. Accordingly, the principles described in detail with respect to the graphical representation illustrated in FIG. 2 are equally applicable here. As may be seen in FIG. 3, the quotient predictor 112 will determine Q to be any one of the following numbers:

$(-3),(-2),(-1),(-0),(+0),(+1),(+2),(+3)$;

depending on the partial remainder and divisor input the quotient predictor 112. Again, after selection, the signed quotient bit $Q_j$ is transmitted to the quotient registers 114a, 114b for storage in the next significant quotient bit register.

Also after selection, the sign and quotient bits are transmitted from the quotient predictor 112 to a carry save adder 120 via $s_j$, $q_j$ lines, respectively. The partial remainder register 106 outputs the divided or "first partial remainder" or a next partial remainder to a shifter 107 which shifts the partial remainder two binary places to the left, thereby producing four times the partial remainder which, in turn is provided by the shifter 107 to the carry save adder 120. The final inputs to the carry save adder 120 are the +0, −0, +D, −D, +2D, −2D, +3D, −3D inputs from the divisor multiplexer 118. However as the quotient prediction bit $q_j$ determined during the first iteration can never be +3 or −3, the divisor multiplexer 118 outputs +0, −0, +D, −D, +2D, and −2D to the carry save adder 120. In this regard, as the divisor register 108 had previously supplied the divisor to the divisor multiplexer 118, the divisor multiplexer can easily produced the above-specified outputs to the carry save adder 120 without difficulty.

Next, the carry save adder 120, which is described in greater detail in U.S. patent application Ser. No. 07/505,350, entitled "A Special Carry Save Adder for High Speed Iterative Division" to Shah et al., filed on even date herewith and previously incorporated by reference, then selects the particular one of the inputs from the division multiplexer 118, i.e. +0, −0, +D, −D, +2D, −2D, which is equal to the product of the signed quotient bit and the divisor for use in the performance of the recursive algorithm set forth below. Then, using the selected output from the divisor multiplexer 118 and the output from the shifter 107, the carry save adder then performs a first iterative calculation to produce a next partial remainder by application of the recursive algorithm as set forth in equation (4) below:

$$P_{j+1} = 4P_j - q_j D \qquad (4)$$

where:

$P_j$ is the partial remainder stored in the partial remainder register 106;

$q_j$ is the signed quotient bit produced by the quotient predictor 112;

D is the divisor; and $P_{j+1}$ is the next partial remainder.

Also during phase two of the first clock pulse, and overlapping with the calculation of the first iteration of $P_{j+1}$, the adder 104 adds the divisor (D) and two times the divisor (2D) to produce three times the divisor (3D). The value 3D is then output to the 3X divisor register 116 for storage. The 3X divisor register 116 then outputs the value 3D to the divisor multiplexer 118 for generation of the +3D and −3D multiples of the divisor to be output to the carry save adder 120 for possible use in successive iterations of the partial remainder calculation.

After calculating a next partial remainder in a redundant form comprised of a plurality of sums and carries by subtracting a multiple of D from $4P_j$, the carry save adder 120 outputs the most significant five sum bits and the most significant five carry bits to the quotient predictor 112 for use in a next iterative calculation of a next iterative prediction of a signed quotient bits by the quotient predictor 112.

The sixth most significant sum and carry bit are used to provide a correction for ambiguous quotient bits to the quotient predictor 112. To further explain this aspect of the invention, reference is again made to FIG. 3. In two areas of the PD plot of FIG. 3, two small cross-hatched areas are illustrated. Thes two cross-hatched areas represent the error caused by using the carry save adder 120 which makes it impossible to predict a quotient within the theoretical error limit while using a 5 bit partial remainder estimate. It is, however, very expensive to add a sixth bit to the partial remainder estimate.

However, by using the NOR of the 6th carry and the 6th sum bits to estimate the error in the 5 bit estimate, we can successfully pick a quotient guess within the theoretical limits. If the NOR of the 6th sum and 6th carry bit is one, then any carry would be killed in the sixth bit, so the difference between the partial remainder estimate derived from adding the top five bits of the sums to the top 5 bits of the carries, and the actual partial remainder can be no greater than $2^{-6}$; so the larger of the possible quotient predictions may be safely used. Conversely, if the NOR of the 6th sum and the 6th carry is zero, then the difference between the partial remainder estimate and the actual partial remainder must be greater than $2^{-7}$; so the smaller of the possible quotient predictions may be used without fear of landing exactly on the lower limit of the range, thereby possibly breaking into repeating threes.

The divider 100 continues to interatively produce a next signed quotient bit for storage in the quotient register 114 as set forth above followed by interatively determining a next partial remainder in the carry save adder 120 until the entire quotient Q has been produced. For a single precision number, the calculation of the quotient Q will require 14 additional iterations of the recursive algorithm, each iteration of the algorithm being completed in one phase of a clock cycle. For a double precision number, the calculation of the quotient will require 28 additional iterations of the algorithm. The divide operation is complete when the quotient register 114 is full.

Now entering the "post-overhead" stage of the division operation, the partial remainder stored in the partial remainder register 106 after completing the fourteenth iteration of the recursive algorithm, if single precision division is being performed, or the twenty-eight iteration of the recursive algorithm, if double precision division is being performed, is output to a zero detect means 122, for example a first adder of conventional design, and a remainder sign detect means 123, for example a second adder of conventional design, for parallel determination of these operations. The remainder sign detect operation is to determine whether the quotient stored in the quotient register 114a is off by one. The zero detect operation is to determine whether or not the completed divide is exact. Each of the zero detect means 122 and the remainder sign detect means 123 receives the remaining sums and carries output by the partial remainder register 106. The output latch 126 would then receive the quotient from the quotient register 114, tack the zero or "sticky" bit from the zero detect means 122, onto the quotient received from the quotient register 114a to provide the quotient with a extra bit for correct rounding in the round unit of the floating point processor. Nearly simultaneously with the zero determination, the remainder sign detect means 123 checks the sign of the addition of the sums and carries output by the partial remainder register 106. If the sign of the addition of the sums and carries is negative, the remainder sign detect means 123 outputs a signal to the output latch 126 indicating that the quotient is too big and that it should use the Q−1 register 114b. The output latch 126 would then use the quotient minus one from the quotient register 114b, tack the zero or "sticky" bit from the zero detect means 122 onto the quotient minus one received from the quotient register 114b to provide the quotient with an extra bit for correct rounding in the round unit of the floating point processor.

Finally, while the mantissa portion of the quotient is being calculated in accordance with the iterative method set forth above, the exponent portion of the quotient is being calculated by an exponent calculation means 124. More specifically, the exponent calculation means is connected to receive the dividend A along the A bus and the divisor B along the B bus. Upon receipt of a control signal from the divider controller 110, the exponent calculation means 124 subtracts the divisor exponent from the dividend exponent and outputs the result to the output latch 126. Once the output latch 126 has received the mantissa quotient from the quotient register 114 and the exponent calculation means 124, respectively, the result of the division operation is output to the floating point processor unit via the RESULT bus.

Figure 4:
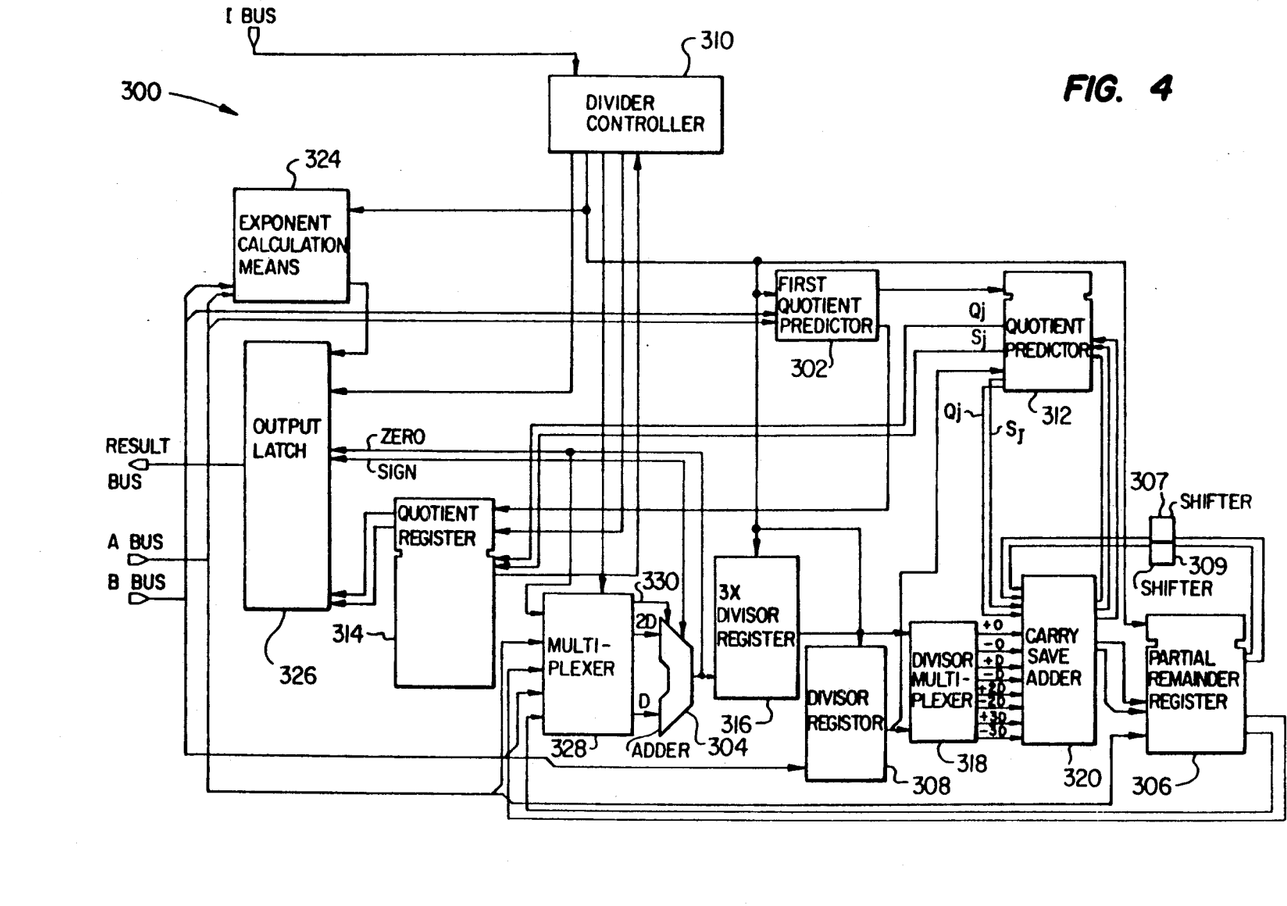
FIG. 4 is a block diagram of a second embodiment of a high speed divider for performing non-restoring iterative division in radix 4.

Referring next to FIG. 4, a space efficient, high speed divider 300 for performing non-restoring iterative division in radix 4 shall now be described. The space efficient, high speed divider described herein is identical in construction and operation to the high speed divider illustrated in FIG. 1 except as noted below. The space efficient divider 300, like the divider 100, includes a first quotient predictor 302, an adder 304, a partial remainder register 306, a shifter 307, a divisor register 308, a shifter 309, a divider controller 310, a quotient predictor 312, a quotient register 314, a 3X divisor register 316, a divisor multiplexer 318, a carry save adder 320, an exponent calculation means 324 and an output latch 326 identical in connection and operation as the corresponding components of the divider 100. Essentially, the space efficient, high speed divider 300 differs from the high speed divider 100 in that the shifter 103, the zero detect means 122 and the remainder detect means 123 have been removed. In this embodiment, however, the sign and zero detect operation previously performed by the zero detect means 122 is now being performed by the adder 304 which, in the previous embodiment, was used only to combine D and 2D. So that the adder 304 is capable of performing multiple functions, a multiplexer 328 is provided to control the inputs to the adder 304.

The inputs of the multiplexer 328 are connected to receive the A operand via the A bus, the B operand via the B bus, a series of sums via a third output of the partial remainder register 306 and a series of carries via a fourth output from the partial remainder register 306. A fifth input to the multiplexer 328 shall be described in greater detail below. During the determination of three times the divisor, the multiplexer 328, upon the receipt of a control signal from the divider controller 310, takes the received divisor B, shifts the received divisor a single decimal point to produce two times the divisor and outputs the divisor and two times the divisor to first and second inputs of the adder 304. Upon receipt by the adder 304 of the divisor and two times the divisor, the space efficient, high speed divider 300 will operate as previously described with respect to FIG. 1 until the last interative determination of the partial remainder has been stored in the partial remainder register 306 and the space efficient, high speed divider 300 enters the post-overhead stage.

In the post-overhead stage, the remaining sums and carries are provided to the multiplexer 328 via the third and fourth outputs of the partial remainder register 306. At this point, the divider controller 310 generates a control signal to the multiplexer 328 so that the sums are output to the adder 304 via and the carries are output to the adder 304 via the first and second adder inputs. The adder 304 adds the sums and carries output by the multiplexer 306 and outputs the result of the addition to the output latch 326. The adder 304 would then output a signal indicating that the sign is positive or negative to the output latch 326 via the sign line. If the addition of the sums and carries shows the remainder sign is positive, the output latch 326 would use the quotient from the quotient register 314a. If, however, the addition of the sums and carries shows the remainder sign is negative, the contents of the Q−1 register 314b would be used by the output latch 326. The output of the adder 304 would also be directed to the fifth input of the multiplexer 328. The multiplexer 328 would then direct the inverse of the adder output back into the adder 304 and add one via a carry-in line 330 to determine the sign of the output sum. As explained before, the zero detect is used to set an extra result bit in the output latch 326.

Figure 5:
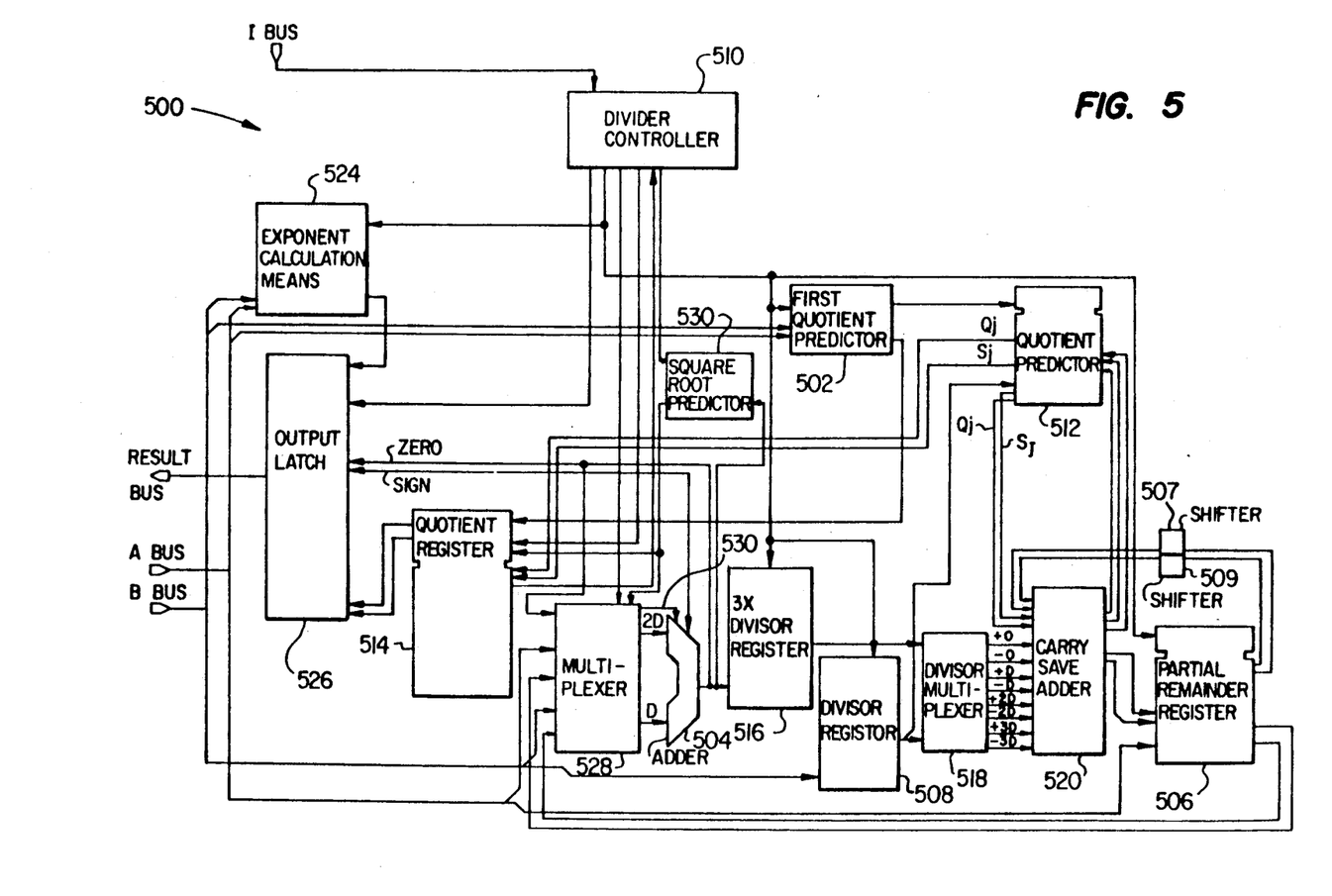
FIG. 5 is a block diagram of the high speed divider of FIG. 4 modified to further perform square root calculations in radix 2.

Referring next to FIG. 5, a space efficient, high speed divider for performing non-restore iterative division in radix 4 and square roots in radix 2 shall now be described. The divider described herein is very similar construction and operation to the high speed divider illustrated in FIG. 4 except as noted below. The divider 500 for performing division and square roots includes a first quotient predictor 502, an adder 504, a partial remainder register 506, a shifter 507, a divisor register 508, a shifter 509, a divider controller 510, a quotient predictor 512, a quotient register 514 which is comprised of a Q register 514a and a Q−1 register 514b, a 3X divisor register 516, a divisor multiplexer 518, a carry save adder 520, an exponent calculation means 524, an output latch 526, and a multiplexer 528 identical in connection and operation as the corresponding components of the space efficient, high speed divider 300 described with respect to FIG. 4. The modification of the high speed divider 500 to perform square root operations in radix 2, i.e. root bits may be selected from the group −1, 0, and +1, as well as divide operations in radix 4 is set forth below.

Unlike a divide operation, a square root operation involves the input of a single operand or "radicand" and the output of a single result which is the square root of the input radicand. The input radicand for which the square root operation is to be performed thereon is input to the multiplexer 528 via either the A bus or the B bus. Upon indication from the divider controller 510 that a square root operation is to be performed on the input from the A bus or B bus, the radicand P is shifted a decimal place to produce two times the radicand P and two times the radicand P is transmitted via the adder 504 to the square root predictor 530 which, like the first quotient predictor 502 and the quotient predictor 512, is a configuration of combinational logic circuitry such that, depending on the input 2P to the square root predictor 530, a prediction of a square root bit Q shall be determined.

Figure 6:
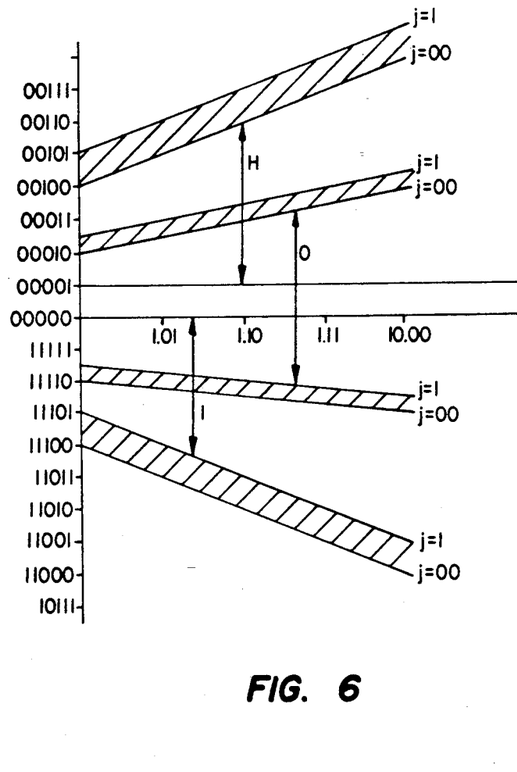
FIG. 6 is a graphical representation of the square root prediction logic of the divider of FIG. 5.

Referring next to FIG. 6, a graphical representation of the square root predictor 530 shall now be described. The predictor plot provides for a given for input value of $2P_j$, a corresponding prediction of the value of the square root quotient bit $q_j$. During each iteration the square root predictor 530 determines a bit of the square root and outputs the predicted bit $q_j$ to the Q and Q−1 registers 514a, 514b, respectively, in accordance with the techniques set forth above. The square root predictor 530 further outputs the predicted square root bit to the multiplexer 528 for use in the next iteration. Repeat iterations are performed until the quotient register is filled with a series of predicted bits and the divider 500 operates as previously described with respect to FIG. 4.

Figure 7:
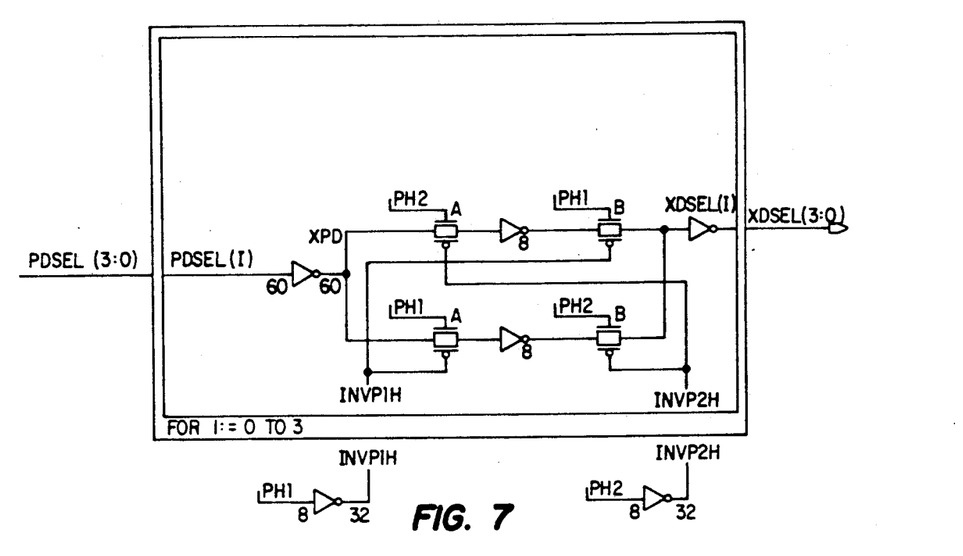
FIG. 7 illustrates per phase logic.

Referring next to FIG. 7, certain changes would be required to the quotient register 114 illustrated in FIG. 1b in order to incorporate a radix 2 square root calculation which requires the writing of one bit into both the Q register 114a and the Q−1 register 114b per iteration. In iteration per phase logic, signals from a given latch may provide data to a logic block which would, in turn, provide a result to the given latch in the same phase. This would cause race through in conventional latches where the result would pass through the latch and change the logic inputs, thereby causing an unpredictable result. In order to overcome race through and provide synchronous operation, so-called "partner" latches such as those illustrated in FIG. 7 had to be developed. During one phase, one partner will receive data while the other partner transmits data. On each successive phase, the partners trade places. Also, in order to use dynamic logic, circuits had to be duplicated with one partner precharging in phase 1 and evaluating in phase 2, and the other partner precharging in phase 2 and evaluating in phase 1.

As can be seen from the above description of the present invention, there is provided an arithmetic operation unit which performs iterative divide and square root operations at a high speed while minimizing the requisite circuitry to perform the divide operation. The pre-overhead time is reduced by overlapping the calculation of a first iteration and the determination of three times the divisor. Furthermore, the use of an adder to produce the sum of the divisor and the divisor shifted (two times the divisor) eliminates the need for a large multiplier. Through the use of simple quotient prediction logic and a multiplexer which provides all possible products of the quotient $Q_j$ and the partial remainder $P_j$ to the means for iteratively producing a next partial remainder, a carry save adder is used to produce the next partial remainder $P_{j+1}$, thereby eliminating the need for the multiplication logic to perform the calculation $P_{j+1}=4P_j+QD$ and permitting the carry save adder to quickly calculate $P_{j+1}$, the divider can perform one iteration of the $Q_j$ and $P_j$ calculations per clock phase. The post-overhead time is reduced by performing zero detect and remainder sign detect in parallel. Finally, the need for additional adder circuitry to determine the final quotient is avoided by providing Q and Q−1 registers for storing the quotient and the quotient minus one in parallel such that, if it is determined that the quotient is off by one, the correct quotient is stored in the parallel quotient register and will not have to be determined. In the space efficient, high speed divider, the output of the partial remainder register at the end of the iterative determination of the quotient is directed to the 3D adder to determine whether the partial remainder is equal to zero and the sign of the partial remainder. In such a manner, the zero detect means and remainder sign detect means are eliminated, therefore saving space.

However, those skilled in the art will recognize that many modifications and variations besides those specifically mentioned may be made in the techniques described herein without departing substantially form the concept of the present invention. Accordingly, it should be clearly understood that the form of the invention described herein is exemplary only and is not intended as a limitation on the scope of the invention.

What is claimed is:

1. Apparatus for performing a division of a first operand by a second operand to produce a result comprised of a series of quotient bits, comprising:

means for iteratively producing a series of partial remainders, said means for iteratively producing a series of partial remainders selecting said first operand as a first partial remainder;

means for iteratively predicting a series of quotient bits, said quotient prediction means predicting a first quotient bit based upon said first operand and said second operand, and a next quotient bit based upon one of said series of partial remainders and said second operand;

a first quotient register connected to said quotient prediction logic to receive and store said next quotient bit determined by said quotient prediction logic;

a second quotient register connected to said quotient prediction logic to receive said next quotient bit and store said next quotient bit minus one;

means for generating multiples of said second operand;

said means for iteratively producing a series of partial remainders determining a next partial remainder based upon one of said series of produced partial remainders and one of said multiples of said second operand;

said means for iteratively producing a series of partial remainders further including means for selecting, based upon said next quotient bit, one of said generated multiples of said second operand for producing said next partial remainder.

2. An apparatus according to claim 1 wherein said means for iteratively producing a series of partial remainders of said first operand determines said next partial remainder in accordance with the following equation:

$$P_{J+1} = 4P_J + q_j D$$

where:

$P_{J+1}$ = said next partial remainder;
   $P_J$ = said prior partial remainder;
   $q_j$ = said prior quotient prediction; and
   $D$ = said second operand.

3. An apparatus according to claim 2 wherein said means for generating multiples of said second operand further comprises means for generating $\pm 0$, $\pm 1$, $\pm 2$, and $\pm 3$ times said second operand.

4. An apparatus according to claim 3 wherein said means for iteratively producing a series of partial remainders of said first operand further comprises multiplexing means for selecting one of said generated multiples of said second operand for producing said next partial remainder, said selected multiple of said operand being equivalent to the product of said second operand and said quotient prediction.

5. An apparatus according to claim 4 wherein said means for generating multiples of said second operand further comprises:

means for shifting said operand to produce two times said second operand; and an adder for adding said second operand and said produced two times said second operand to produce three times said operand.

6. An apparatus according to claim 1 wherein said means for iteratively producing a series of partial remainders of said first operand produces each of said series of partial remainders as a plurality of sums and carries.

7. An apparatus according to claim 6 further comprising means for determining that said result has been produced.

8. An apparatus according to claim 7 wherein said:

means for determining that said result has been produced further comprises:

means for determining the sign of said partial remainder; and means for adjusting said result based on the sign of said partial remainder.

9. An apparatus according to claim 8 wherein said means for iteratively producing a series of partial remainders of said first operand determines said next partial remainder in accordance with the following equation:

$$P_{J+1} = 4P_J + QD$$

where:

$P_{J+1}$ = said next partial remainder;
   $P_J$ = said prior partial remainder;
   $Q$ = said prior quotient prediction; and
   $D$ = said second operand.

10. An apparatus according to claim 9 wherein said means for generating multiples of said second operand further comprises means for generating $+0$, $+1$, $+2$, and $+3$ times said second operand.

11. An apparatus according to claim 10 wherein said means for iteratively producing a series of partial remainders further comprises multiplexing means for selecting one of said generated multiples of said second operand for producing said next partial remainder, said selected multiple of said operand being equivalent to the product of said second operand and said quotient prediction.

12. An apparatus according to claim 11 wherein said means for generating multiples of said second operand further comprises:

means for shifting said operand to produce two times said second operand; and an adder for adding said second operand and said produced two times said second operand to produce three times said second operand.

13. An apparatus according to claim 12 wherein said means for iteratively predicting a series of quotient bits based upon a corresponding one of said series of partial remainders of said first operand and said second operand further comprises:

a first quotient prediction circuit connected to receive said first and second operands, said first quotient prediction circuit predicting a first quotient bit; and a second quotient prediction circuit connected to receive said first predicted quotient bit, said divisor and series of partial remainders, said second quotient prediction circuit iteratively predicting the remaining bits of said series of quotient bits.

14. An apparatus for dividing a dividend by a divisor to produce a result, comprising:

a partial remainder register connected to receive and store said dividend as a partial remainder;

a divisor register connected to receive and store said divisor;

quotient prediction logic connected to receive said divisor from said divisor register and said partial remainder from said partial remainder register, said quotient prediction logic determining a quotient bit based upon said received divisor and partial remainder;

a first quotient register connected to receive and store said quotient bit determined by said quotient prediction logic;

means, connected to said divisor register, for generating multiples of said divisor; and a carry save adder connected to receive said multiples of said divisor from said means for generating multiples of said divisor and said predicted quotient bit from said quotient prediction logic, said carry save adder determining a next partial remainder by selecting one of said multiples of said divisor and adding it to said partial remainder, said partial remainder register connected to receive and store said next partial remainder in place of said partial remainder, said quotient prediction logic connected to receive said next partial remainder to determine a next quotient bit.

15. An apparatus according to claim 14 wherein said carry save adder produces said partial remainder as a plurality of sums and carries and said apparatus further comprises a first adder connected to receive said partial remainder from said partial remainder register, said adder adding said sums and carries to determine whether said result has been produced.

16. An apparatus according to claim 15 further comprising a second adder connected to receive said partial remainder from said partial remainder register, said second adder determining the sign of said sums and carries.

17. An apparatus according to claim 16 wherein said quotient prediction logic further determines, for every quotient bit determined, the quotient bit minus one, said apparatus further comprising a second quotient register connected to receive and store said quotient bit minus one determined by said quotient prediction logic.

18. An apparatus according to claim 17 further comprising:
means for determining whether said quotient bit stored in said first quotient register is off by one; and
means for replacing said quotient stored in said first quotient register by said quotient minus one stored in said second quotient register.

19. An apparatus according to claim 18 further comprising an output latch connected to receive said quotient from said first quotient register.

20. An apparatus according to claim 19 wherein said dividend, said divisor and said result are each comprised of a mantissa portion and an exponent portion, said quotient being produced by dividing the mantissas of said dividend and said divisor and said apparatus further comprising exponent calculation means connected to receive the exponents of said dividend and said divisor, said exponent calculation means subtracting said divisor exponent from said divident exponent to determine said result exponent, said output latch being further connected to receive said result exponent from said exponent calculation means.

21. An apparatus according to claim 16 further comprising:
first shifting means connected to receive said divisor for producing two times said divisor;
a third adder connected to receive two times said divisor from said first shifter and said divisor; and a second divisor register connected to receive and store three times said divisor from said second adder.

22. An apparatus according to claim 21 further comprising a first multiplexer connected to receive said divisor from said divisor register and three times said divisor from said second divisor register and to output +0, +1, +2, and +3 times said divisor to said carry save adder.

23. An apparatus according to claim 22 wherein said carry save adder determines a next partial remainder in accordance with the following equation:

$$P_{J+1} = 4P_J + q_j D$$

where:
$P_{J+1}$ = said next partial remainder;
$P_J$ = said prior partial remainder;
$q_j$ = said prior quotient prediction; and
$D$ = said second operand.

24. An apparatus according to claim 23 wherein said carry save adder further comprises:
second shifting means for shifting said partial remainder twice to produce four times said partial remainder; and
means for selecting one of said inputs from said multiplexer based upon said quotient prediction.

25. An apparatus according to claim 24 wherein said carry save adder produces said next partial remainder by adding said partial remainder shifted twice to produce four times said partial remainder and said multiplexer input equal to the product of said divisor and said quotient prediction.

26. An apparatus according to claim 14 further comprising:
a first multiplexer connected to receive said divisor, said multiplexer including shifter means for producing two times said divisor from said divisor; and
a first adder connected to receive two times said divisor from said multiplexer means and said divisor.

27. An apparatus according to claim 26 further comprising a second divisor register connected to receive and store three times said divisor from said second adder.

28. An apparatus according to claim 26 further wherein said first multiplexer is further connected to receive said plurality of sums and carries from said partial remainder register, said multiplexer configured to selectively output either said divisor to said first adder for said determination of three times the divisor or said plurality of sums and carries to said first adder for determining said partial remainder sign and final remainder zero detect.

29. An apparatus according to claim 28 further comprising an output latch connected to receive said quotient from said quotient register, said output latch further connected to receive signals from said first adder indicative of whether said partial remainder is zero.

30. An apparatus according to claim 29 further comprising means for providing a return path for said addition of said sums and carries output from said first adder back to said first adder to determine the sign of said partial remainder.

31. An apparatus according to claim 30 further comprising means for providing said determined sign of said partial remainder to said output latch.

32. An apparatus according to claim 31 wherein said quotient prediction logic further determines, for every quotient bit determined, the quotient bit minus one, said apparatus further comprising a second quotient register connected to receive and store said quotient bit minus one determined by said quotient prediction logic.

33. An apparatus according to claim 32 further comprising:

square root prediction logic connected to receive a radicand from said adder, said square root prediction logic determining a predicted root bit based upon said radicand;

means for providing said predicted root bit to said first quotient register and said first multiplexer;

said multiplexer iteratively providing two times said predicted root bit to said square root prediction logic for determining a next predicted root bit.

* * * * *